United States Patent [19]

Takada

[11] Patent Number: 4,466,666
[45] Date of Patent: Aug. 21, 1984

[54] SEAT BELT ANCHOR ASSEMBLY

[76] Inventor: Juichiro Takada, 12-1,3 Chome, Shinmachi, Setagaya-ku, Tokyo, Japan

[21] Appl. No.: 366,217

[22] Filed: Apr. 7, 1982

[30] Foreign Application Priority Data

May 1, 1981 [JP] Japan .................................. 56-062680

[51] Int. Cl.$^3$ ........................ A47D 15/00; A62B 35/00
[52] U.S. Cl. ................................... 297/483; 280/808; 297/468
[58] Field of Search ............... 297/483, 485, 475, 476, 297/468, 410; 280/808, 801, 804; 248/505, 499, 503.1

[56] References Cited

U.S. PATENT DOCUMENTS

| 3,672,722 | 6/1972 | Murcott | 297/410 X |
| 4,135,737 | 1/1979 | Scholz | 297/808 |
| 4,225,185 | 9/1980 | Krzok | 297/468 |
| 4,311,323 | 1/1982 | Provensal | 280/808 |

FOREIGN PATENT DOCUMENTS

| 2344287 | 3/1975 | Fed. Rep. of Germany. | |
| 2657819 | 6/1978 | Fed. Rep. of Germany | 297/483 |
| 1367248 | 9/1974 | United Kingdom | 297/483 |

Primary Examiner—James T. McCall
Attorney, Agent, or Firm—Brumbaugh, Graves, Donohue & Raymond

[57] ABSTRACT

A seat belt anchor assembly comprising an elongated rail of C-shape in cross-section having spaced-apart holes in the base wall portion and a belt anchor having a retainer within the rail that is locked in a selected position along the rail by a spring-loaded lock pin. The lock pin fits into any of the holes and can be released from the holes to enable the anchor to be moved to another position.

1 Claim, 5 Drawing Figures

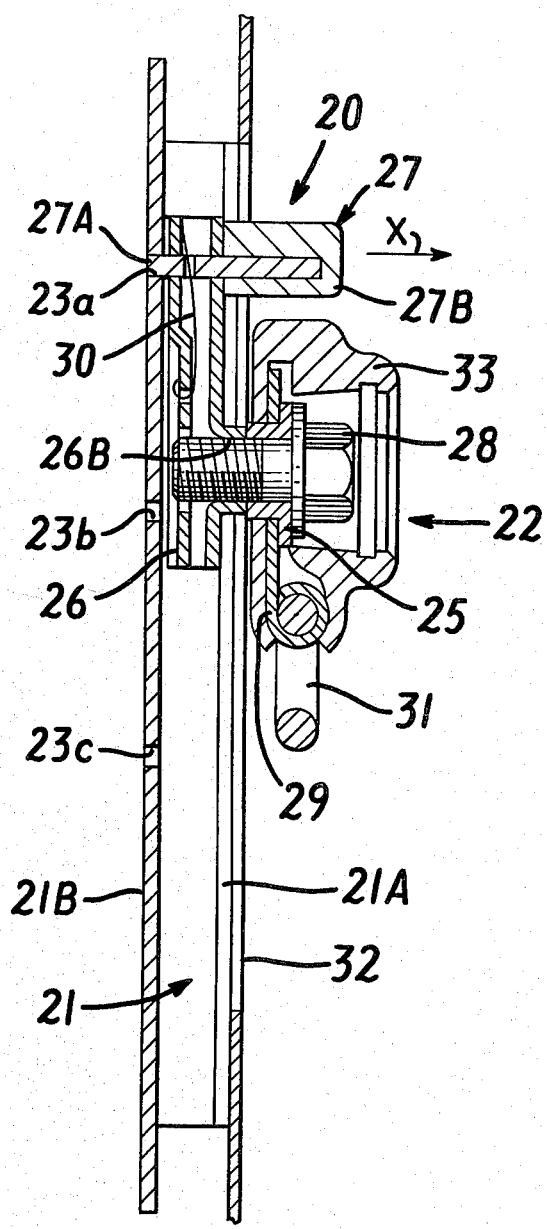
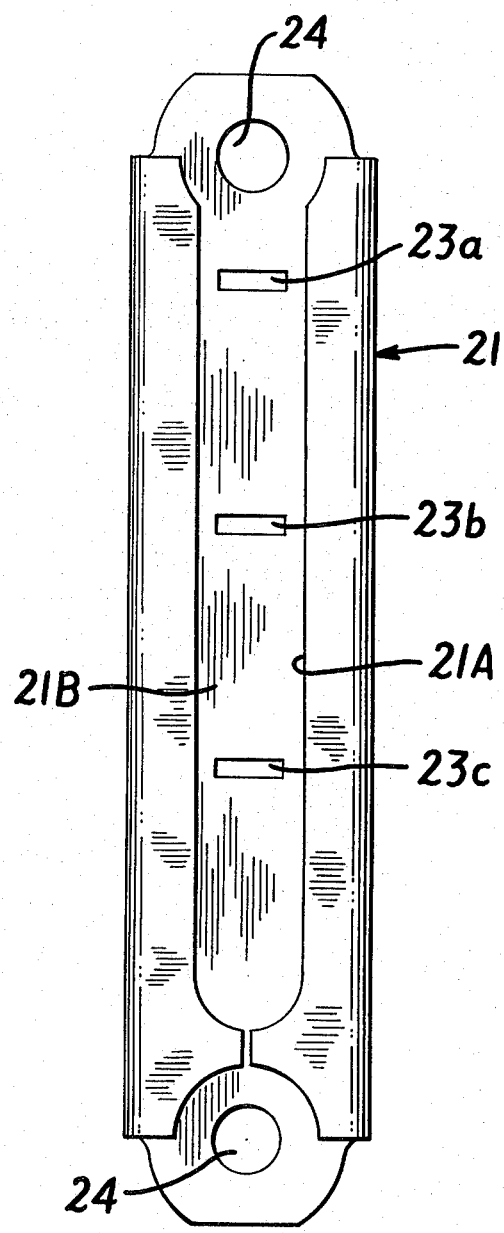
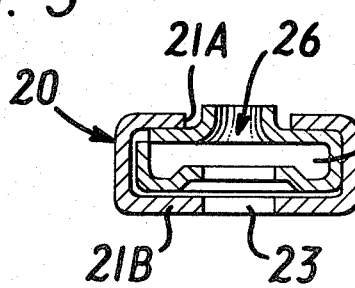
FIG. 3
FIG. 4
FIG. 5

SEAT BELT ANCHOR ASSEMBLY

FIELD OF THE INVENTION

The present invention relates to vehicle seat belt systems and, in particular to a belt anchor assembly that is mounted on the center pillar of a vehicle body and is constructed to enable the height of the anchor to be adjusted so that a shoulder belt connected to the anchor fits the particular seat occupant comfortably and correctly.

BACKGROUND OF THE INVENTION

A very common type of seat belt system used in passenger cars and other automotive vehicles includes a shoulder belt that leads from an anchor affixed to the center pillar of the vehicle body at a location outboard of, above and behind the shoulder of the occupant of the seat inwardly and downwardly across the torso of the occupant to a buckle or other fastening device located adjacent the lower rear of the inboard side of the seat. Such a shoulder belt may be used in conjunction with a lap belt or with an energy absorbing knee bolster. It has been proposed in the past that the belt anchor on the center pillar be mounted for adjustment of its position in the vertical direction so that the shoulder belt will fit better to the physique of the particular occupant.

FIG. 1 of the accompanying drawings illustrates a known adjustable belt anchor of the type used on the center pillar for the upper outboard end of a shoulder belt. The center pillar has a slot 1 that opens into the passenger compartment. A reinforcing plate 3 having a multiplicity of vertically spaced-apart notches 2 is installed within the center pillar adjacent the slot. A locking plate having a pair of vertically spaced-apart forwardly projecting flanges 4 is received behind the reinforcing plate 3 with the flanges received in a selected adjacent pair of the notches 2. The shoulder belt 6 is received by an anchor plate 7 that, in turn, is connected to the reinforcing plate by a bolt 8 that extends through the locking plate into a nut 10. A saucer-shaped spring 9 is received between the head of the bolt 8 and the anchor plate 7 and allows the anchor to be repositioned along the reinforcing plate 3 by pushing in on the head of the bolt, thereby deforming the spring 9, pushing rearwardly on the nut and locking plate and disengaging the flanges 4 from the notches 2. The anchor assembly can then be adjusted up or down, and upon release of pressure on the bolt head, the spring 9 pulls the nut 10 and the locking plate 5 forwardly to position the flanges 4 in another pair of notches 2. This anchoring arrangement is somewhat unstable because of the presense of the spring 9, and inward components of force on the belt 6 can easily overcome the spring force and produce rocking and cocking motion of the assembly relative to the desired stable position in engagement with the reinforcing plate.

SUMMARY OF THE INVENTION

An object of the present invention is to eliminate the instability of an adjustable belt anchor of the type shown in FIG. 1 of the accompanying drawings and to provide and adjustable belt anchoring assembly that is easy to operate, is reliable, and stays in position without rocking or cocking as a result of forces on the belt or other causes.

More particularly, the present invention is a seat belt anchor assembly that comprises an elongated rail of substantially uniform, generally C-shaped cross-section and a belt anchor having a slider portion received within the rail and including a retainer member that is arranged to fix the anchor at any one of a multiplicity of selected positions along the rail. The invention is characterized in that back wall of the rail has a multiplicity of holes arranged along the path traversed by the anchor when it is moved among the selected positions. The retainer member is a lock pin that is carried by the slider portion for movement under the urging of a spring into a selected one of the holes. The lock pin projects outwardly from the rail for access from inside the passenger compartment so that it can be grasped and pulled out by the occupant to enable repositioning of the anchor and then released for reception in another one of the holes at another position of the anchor along the rail.

For a better understanding of the invention reference may be made of the following description of exemplary embodiments, taken in conjunction with the figures of the accompanying drawings.

DESCRIPTION OF THE DRAWINGS

FIG. 3 is a side cross-sectional view of an exemplary embodiment of a seat belt anchoring assembly according to the present invention;

FIG. 4 is a front elevational view of the rail member of the embodiment shown in FIG. 3; and FIG. 5 is a top cross-sectional view of the rail and the slider component of the anchor.

DESCRIPTION OF THE EXEMPLARY EMBODIMENT

Figure 1:
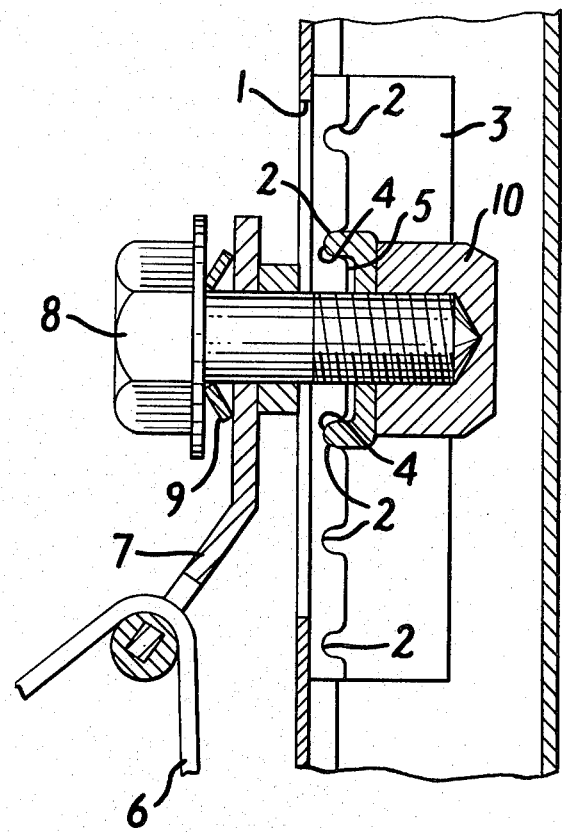
FIG. 1 is a side cross-sectional view of an adjustable seat belt anchor device that is known in the prior art.
Figure 2:
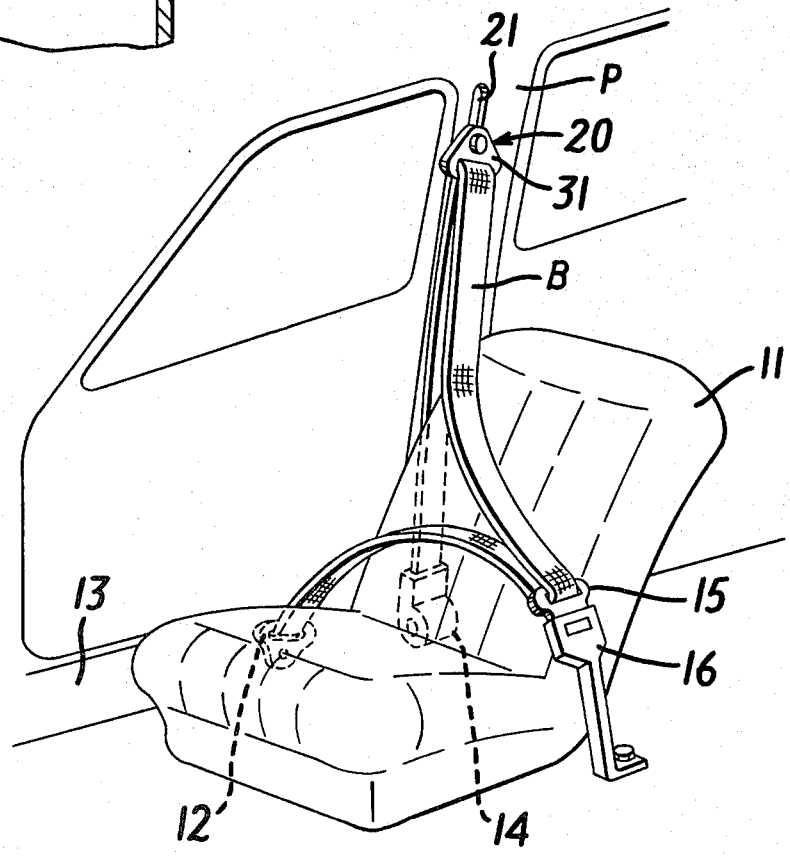
FIG. 2 is a pictorial view in generally schematic form of a conventional seat belt system for which the present invention is well suited.

In the seat belt system shown in FIG. 2 a continuous restraint belt B leads from an emergency locking retractor 14, which is mounted near the lower end of the center pillar P, upwardly along the pillar P, passes through an anchor member 20, turns downwardly and inwardly across the seat, passes through a buckle tongue 15 and then leads back outwardly across the seat to an anchor 12 affixed to the rocker panel 13 at a position near the lower rear outboard portion of the seat 11. The buckle tongue 15 is received within a buckle 16 that is affixed to the vehicle floor adjacent the lower rear inboard side of the seat. The portion of the belt extending between the anchor assembly 20 and the buckle tongue 15 is a shoulder belt that engages the torso of the seat occupant, and the portion of the belt that extends across the seat between the buckle tongue 15 and the anchor 12 is a lap belt for restraining the lower body of the occupant. This system is well known and is in widespread use in commercially available motor vehicles. In accordance with the present invention, the anchor assembly 20 is adjustable in respect of its height above the seat, thereby enabling the shoulder portion of the belt to be properly and comfortably fitted to occupants of various statures and physiques.

As shown in FIGS. 3 to 5 of the drawings, the anchor assembly 20, in accordance with the present invention, comprises a rail 21 that is generally C-shaped in cross-section and is attached to the center pillar P by bolts that pass through holes 24 at the upper and lower ends.

The rail receives a belt anchor 22 that can be adjusted vertically among a multiplicity of selected positions along the length of the rail and that is stably and reliably locked to the rail in any of the selected positions.

The rail 21 has a front wall defined by flanges that extend inwardly from the side walls, thereby leaving a slot 21A between the inner edges of the front flanges. The back wall 21B has a series of vertically spaced-apart, identical holes 23a, 23b and 23c. In the embodiment shown in the drawing, the holes are of rectangular shape, but they may be round, square, oval or of any other suitable shape.

The anchor includes a slider 26 that is stamped and bent from steel plate and is therefore hollow, but the slider may be also made of solid metal. It includes an internally threaded flange 26B for receiving a bolt 28 by which an anchor plate 29 is secured to it with a bushing 25 interposed. A belt ring 31 is secured to the plate by a flange at the lower end of the plate that wraps around the upper transverse segment of the ring 31. At the upper end of the slider 26 are a pair of slots having a shape substantially matching the shapes of the holes 23a, etc., in the rail 21, and these holes receive the shank portion 27A of a lock pin 27. The lock pin has a small knob 27B at its inner end in front of the rail 21 that can be grasped by the occupant to enable the pin to be pulled out of any of the holes 23a, 23b or 23c in the direction of the arrow X and thereby permit the anchor 22 to be slided upwardly or downwardly to another position along the rail. The lock pin 27 is constantly urged in a direction toward the outside of the vehicle (opposite to the direction indicated by the arrowed line X in FIG. 3) by a leaf spring 30.

The rail is received behind a trim piece 32 on the interior of the center pillar, and the appearance of the anchor assembly is improved by a cover 33 that encloses the external parts. The access hole in the cover 33, which opens inwardly toward the passenger compartment to enable installation of the bolt 28, can be closed by an insert (not shown) that snaps into place after the assembly is installed but can easily be removed should any repair or replacement of the anchor assembly be required.

FIG. 3 shows the anchor assembly in a locked position. In particular the lock pin 27 is held by the spring 30 in the upper hole 23a in the rail 21. Should the vehicle occupant wish to reposition the anchor 22 he or she need only grasp the knob 27B of the lock pin, pull the lock pin out against the force of the leaf spring 30, thereby removing it from the hole 23a, and then slide the anchor 22 to another position. In practice, once the pin is pulled out and the anchor is moved a short distance, the occupant can if desired, release the pulling force on the lock pin and slide the anchor up or down. As soon as the anchor reaches the next position, the lock pin will automatically spring into the hole 23a, 23b or 23c at that position. If a new position is not satisfactory, the occupant can repeat the procedure and move on to the next position. It should be apparent that any number of positions over a desired vertical span of adjustment may be provided by making suitable holes in a rail of the desired total length.

The lock pin holds the anchor 22 in the desired position, regardless of the magnitude or direction of a force applied to the belt ring, so the anchor is very stable and is strongly retained within the C-shaped rail, which itself may be of great strength by virtue of its channel shape.

The assembly is also easy to install during the manufacture of the vehicle and in case of any repair work. At a suitable point along the assembly line, the rail 21 can be fastened to the pillar by bolts that pass through the holes 24. The rail preferably arrives at the assembly line with the slider 26 already in place, but the slider can also be slided in from the top of the rail where the slot is open later on after the rail is installed. The lock pin 27 and spring 30 are, of course, preinstalled on the slider 26.

The bushing 25, the anchor plate 29, the belt ring 31, the bolt 28 and the cover 33 constitute another sub-assembly of the device that may be supplied as part of the belt group. At a suitable point along the assembly line after the interior trim component 32 has been installed, the aforementioned external sub-assembly can be joined to the retainer 26 by merely threading the bolt 28 into the threaded flange 26B.

Thus the invention provides an effective belt anchor assembly that enables the position of the seat belt to be changed quickly and easily. The invention maintains the anchor in stable position and is not influenced by vibrations or forces on the belt. The assembly is easy to install when the vehicle is manufactured and easy to repair.

I claim:

1. A seat belt anchor assembly comprising an elongated rail of substantially C-shaped cross-section and having inturned side flanges defining a slot and holes spaced-apart along the back wall, a hollow slider received within the rail and having side wall portions underlying the side flanges and an internally threaded protrusion extending out through the slot in the rail, a belt anchor plate pivotably attached to the slider by a bolt threaded into the protrusion, a lock pin extending through aligned holes in the front and back walls of the slider and adapted to be received in a selected one of the holes in the back wall of the rail, and a leaf spring received within the slider and engaged between the slider and the lock pin to urge the lock pin into the selected hole in the rail.

* * * * *